United States Patent Office 2,891,051
Patented June 16, 1959

2,891,051
ADDUCTS OF SALTS OF NOVOBIOCIN

Walter D. Celmer, Garden City, and Billie Kenneth Koe, Woodside, N.Y., assignors to Chas. Pfizer & Co., Inc., Brooklyn, N.Y., a corporation of Delaware No Drawing. Application March 28, 1957
Serial No. 649,022

9 Claims. (Cl. 260—210)

This invention relates to a new and useful class of novobiocin salt adducts, to a method of producing the same and to a method of producing novobiocin salts of improved purity.

The novel acidic antimicrobial agent called novobiocin and salts of this acid as well as the method of preparing the same are the subject matter of copending application Serial No. 550,077 of November 30, 1955, the latter being a continuation-in-part of now abandoned application Serial No. 542,485, of October 24, 1955. The method of purifying novobiocin and its salts as produced by those applications involves a series of extraction and concentration steps. For example, the filtered broth is adjusted to a pH of about 2 by the addition of a mineral acid and is then extracted with a solvent such as methyl isobutyl ketone. This extract is washed with dilute sodium bicarbonate to remove impurities, the washed solvent extract is extracted with aqueous ammonium hydroxide to produce the ammonium salt, the resulting aqueous extract is further extracted with ether after adjustment to a low pH with mineral acid to again obtain the free acid of novobiocin, etc. Besides the low yield of product obtained by these and similar extraction and concentration methods, much is left to be desired from the standpoint of using such a procedure on a commercial scale.

The present invention is based on the discovery that the sodium and potassium salts of novobiocin form adducts with methanol and ethanol and that these adducts are useful intermediates in the production of substantially pure sodium and potassium novobiocin. Sodium and potassium novobiocin may in turn be converted to novobiocin or other salts if desired. A further unexpected feature of the present invention is the discovery that other alcohols such as n-propanol, 2-propanol and n-butanol do not form adducts with sodium and potassium novobiocin when operating in accordance with the process of the present invention to produce its novel adducts.

Since the methanol and ethanol adducts of the present invention are relatively unstable, sodium or potassium novobiocin may be recovered by simple heating, e.g., air drying. This advantage is of significance not only because of the simple procedure involved, but for the further reason that methanol or ethanol may be recovered substantially quantitatively.

The novel adducts of the present invention are prepared by producing a methanol or ethanol solution of a crude sodium or potassium salt of novobiocin, adjusting the concentration of a solution to form a supersaturated solution of novobiocin salt in alcohol, and recovering precipitated crystalline alcoholic adduct of the novobiocin salt.

The alcoholic solution of the crude salt may be prepared by a number of methods. For example, the crude sodium or potassium novobiocin salt may be dissolved directly in the selected alcohol, the upper limit of concentration without precipitation of novobiocin salt being about 5–20% and depending upon conditions of temperature and purity of the selected salt. Another method of forming a solution of crude novobiocin salt in the selected alcohol involves adding crude novobiocin (the free acid) to an alcoholic solution containing at least an equimolar amount of a basic alkali metal compound, the basic alkali metal compound being sodium or potassium hydroxide, bicarbonate, etc. Still another method involves salt formation in solution by conventional metathetical reaction, e.g., reaction of crude triethylamine salt of novobiocin with sodium iodide in ethanol.

Upon producing the crude novobiocin solution in the selected alcohol, the concentration of the solution is adjusted to form a supersaturated solution of novobiocin salt in alcohol. This step may be accomplished in one of several ways, including for example, evaporation of the solvent or addition of further crude novobiocin salt. Upon obtaining a supersaturated solution by adjusting the concentration, the alcoholic adduct of novobiocin salt precipitates. Precipitation may be aided by seeding through the addition of novobiocin salt crystals and/or by cooling. After recovery of the first batch of adduct crystals, successive batches may be obtained and thereby improve the yield by concentration of the mother and/or alcoholic wash solutions.

The crystalline adduct products of the present invention are colorless and melt with decomposition at the same temperature as their alcohol-free salts. The sodium-methanol adduct melts at about 225 ±5° C. with decomposition and loses birefringence about 10° C. before melting. However, the sodium salt-methanol adduct and the solvent-free sodium salt may be differentiated by their solubility behavior. At room temperature, 0.1 g. of the solvent-free crystals easily dissolves in 1 ml. of methanol, but the less soluble adduct crystallizes from the solution upon standing or immediately when seeded. In contrast, 0.1 g. of adduct could not be dissolved in 1 ml. of methanol but was completely soluble in 2 ml. The sodium salt-ethanol adduct of the rectangular plate system is strongly birefringent and melts at 217–222° C. with decomposition. Like the methanol adduct, the ethanol adduct is also less soluble than its solvent-free product in the solvating solvent.

The foregoing description and the examples appearing hereinafter are for the purpose of illustration only and not limiting to the scope of the invention which is set forth in the claims.

Example 1

A solution of 337 grams of crude novobiocin in 3 liters of methanol was agitated and 135 grams of a decolorizing carbon (Norite A) was added. The mixture was stirred for 15 minutes and the carbon was then filtered. The carbon was washed with 370 ml. of methanol. The filtrate was agitated and 202 ml. of 2.54 N solution of sodium hydroxide in methanol was added to bring the pH to 8.25. The solution was then evaporated under vacuum to a volume of about 2.4 liters. The methanol adduct of sodium novobiocin then crystallized. The mixture was cooled with stirring to 5° C. and the crystalline product was filtered. It was washed several times with cold methanol and the crystals were allowed to dry in air at room temperature. This product weighed 175 grams. A sample was dried at 100° C. under .01 mm. pressure for two hours resulting in the loss of 12.8% of the weight of the sample. The dry sample was analyzed. It melted at 222–229° C. with decomposition and lost its birefringence at 212° C. It had a neutral equivalent of 653 when titrated in water with acid. The ultraviolet absorption spectrum displayed maxima at 237, 269, and 304 m$\mu$ when a sample was dissolved in pH 6 phosphate buffer. In a 90% methanol solution and 0.1 N hydrochloric acid, the ultraviolet absorption had a maxima at 324 mu. In 0.1 N aqueous sodium hydroxide, it had a maxima at 307 mμ. The optical rotation $[\alpha]_D^{25}$ (C. 1%) in pyridine was −31.8°, in methanol −45.4° in 0.5 N aqueous sodium hydroxide −37.8°.

Further crystalline product was obtained by concentrating the solution to 1.5 liters and cooling to 5° C. The second crop weighed 52 grams when dried at room temperature in air. A further crop weighing 62 grams was obtained by further concentration.

*Example II*

A solution of 45.4 grams of crude crystalline novobiocin in 300 ml. of absolute ethanol was filtered using a diatomaceous earth filteraid. The filter-cake was washed with 154 ml. of anhydrous ethanol. To this solution was added 27.3 ml. of 2.54 N ehtanolic sodium hydroxide. The mixture was cooled and seeded and the ethanol adduct of the sodium salt crystallized from solution. The mixture was allowed to stand overnight at a low temperature and the product was filtered. It was washed with a small volume of cold absolute ethanol and the crystalline product was then dried. Nineteen grams was obtained in this first crop. It assayed 1120 units/mg. A second crop of the same potency was obtained by evaporation of the mother liquor. In all a yield of 71% was obtained.

*Example III*

Sodium novobiocin was converted to the crystalline adduct by preparing a 10% solution of the salt in absolute ethanol at 50–60° C. The hot solution was filtered using a diatomaceous earth filteraid and the filtrate was allowed to cool slowly. The adduct separated in crystalline form as a thick slurry. This product was filtered, washed with a small volume of absolute ethanol and dried in air at 25° C. From 121 grams of the sodium salt there was obtained in the first crop 93 grams of the crystalline adduct assaying 1120 units/mg. By concentrating the mother liquor a second crop of 23 grams assaying 1090 units/mg. was obtained. A further crop weighing 7 grams and assaying 1120 units/mg. was obtained.

*Example IV*

A solution of crude triethylamine salt of novobiocin in 15 ml. of 2B ethanol was filtered through a diatomaceous earth filteraid and the cake was washed with 10 ml. of 2B ethanol. 1.06 grams of sodium iodide was added to the solution and the mixture was warmed slightly to dissolve the salt. The solution was then cooled in an ice bath and seeded with the ethanol adduct of sodium novobiocin. The mixture was allowed to stand at a low temperature overnight and the crystalline ethanol adduct of sodium novobiocin was filtered. It was washed with a small volume of cold 2B ethanol and dried in air.

*Example V*

A solution of 11 grams of crude triethylamine salt of novobiocin in 100 ml. of methanol was treated with 2 grams of sodium acetate trihydrate. The mixture was warmed to dissolve the salt and the solution was then concentrated under vacuum to one-third its volume. The mixture was cooled and seeded with the methanol adduct of sodium novobiocin. Crystals in the form of fine needles separated slowly. The product was filtered, washed with a small volume of ethanol and air dried. The triethylamine salt of novobiocin may be prepared by concentrating a methyl isobutyl ketone extract of fermentation broth and adding triethylamine.

*Example VI*

A solution of 1.0 gram of crystalline novobiocin in 10 ml. of methanol was clarified by filtration and adjusted to pH 8.25 by the addition of 0.64 ml. of 2.49 N mehtanolic potassium hydroxide. The solution was evaporated to dryness, and the solid residue was triturated with 1 ml. of methanol until the potassium salt methanol adduct crystallized. The slurry of crystalline adduct was cooled to 5° and filtered; product was washed with cold methanol and dried over anhydrous calcium chloride in vacuum at room temperature. Yield, 0.52 gram (first crop).

Properties:
Volatiles, 8.1% (2 hours in high vacuum at 56°).
$[\alpha]_D^{25}$ −49.5° (C. 1% methanol), −21.9° (C. 1% pyridine).

U.V.—$E_{1\,cm.}^{1\%}$ 572 at $m\mu_{max}$ 307 (0.1 N sodium hydroxide).

Assay=1000 units/mg.

On concentrating the first crop mother liquor, a second crop of crystalline methanol adduct was recovered. Yield, 0.23 gram ($[\alpha]_D^{25}$ −45.6°, C. 1% methanol).

What is claimed is:

1. A solid alcoholic adduct of a salt of novobiocin, the alcohol being selected from the group consisting of methanol and ethanol and the novobiocin salt being selected from the group consisting of sodium and potassium novobiocin.

2. A solid adduct of sodium novobiocin and methanol.

3. A solid adduct of sodium novobiocin and ethanol.

4. A solid adduct of potassium novobiocin and methanol.

5. The process of producing a novobiocin salt of improved purity which comprises the steps of producing an alcohol solution of a crude novobiocin salt, adjusting the concentration of said solution to form a supersaturated solution of novobiocin salt in alcohol, and recovering precipitated crystalline alcoholic adduct of the novobiocin salt, the alcohol being selected from the group consisting of methanol and ethanol and the novobiocin salt being selected from the group consisting of sodium and potassium novobiocin.

6. The process of claim 5 wherein crude novobiocin is introduced into an alcoholic solution containing at least an equimolar amount of a basic alkali metal compound, the alkali metal being selected from the group consisting of sodium and potassium.

7. The process of claim 5 wherein recovered alcoholic adduct is heated to obtain substantially pure novobiocin salt.

8. The process of producing a novobiocin salt of improved purity which comprises the steps of producing an alcohol solution of a novobiocin salt, concentrating said solution by the removal of alcohol, and recovering precipitated crystalline alcoholic adduct of the novobiocin salt, the alcohol being selected from the group consisting of methanol and ethanol and the novobiocin salt being selected from the group consisting of sodium and potassium novobiocin.

9. The process of claim 8 wherein recovered alcoholic adduct is heated to obtain substantially pure novobiocin salt.

References Cited in the file of this patent

UNITED STATES PATENTS 2,771,392   Tanner et al. _____ Nov. 20, 1956

OTHER REFERENCES

Hoeksema et al.: "Antibiotics & Chemotherapy," vol. 6, No. 2, February 1956, page 147.